United States Patent [19]

Sato et al.

[11] 4,440,715
[45] Apr. 3, 1984

[54] METHOD OF CONTROLLING NUCLEAR POWER PLANT

[75] Inventors: Takao Sato, Ibaraki; Tetsuo Ito; Setsuo Arita, both of Hitachi, all of Japan

[73] Assignee: Hitachi, Ltd., Tokyo, Japan

[21] Appl. No.: 192,993

[22] Filed: Oct. 2, 1980

[30] Foreign Application Priority Data

Oct. 5, 1979 [JP] Japan ................................ 54-128357

[51] Int. Cl.³ .............................................. G21C 7/00
[52] U.S. Cl. .................................. 376/210; 376/211; 376/244
[58] Field of Search ............... 376/207, 210, 211, 241, 376/244, 215–218, 285

[56] References Cited

U.S. PATENT DOCUMENTS

| | | | |
|---|---|---|---|
| 2,989,453 | 6/1961 | Esselman et al. | 376/210 |
| 3,349,003 | 10/1967 | Kagi | 376/210 |
| 3,437,557 | 4/1969 | Kaipainen et al. | 376/207 |
| 3,766,007 | 10/1973 | Rolstad et al. | 376/210 |
| 4,057,467 | 11/1977 | Kostrzewa | 376/285 |
| 4,104,117 | 8/1978 | Parziale et al. | 376/211 |
| 4,290,850 | 9/1981 | Omori et al. | 376/210 |
| 4,302,288 | 11/1981 | Younborg | 376/210 |

FOREIGN PATENT DOCUMENTS

| | | | |
|---|---|---|---|
| 2803000 | 8/1978 | Fed. Rep. of Germany | 376/210 |
| 5142894 | 11/1974 | Japan | 376/210 |
| 5257494 | 7/1975 | Japan | 376/210 |
| 52-37695 | 3/1977 | Japan | 376/210 |
| 53-4192 | 1/1978 | Japan | 376/210 |
| 54-111090 | 8/1979 | Japan | 376/210 |

*Primary Examiner*—Sal Cangialosi
*Attorney, Agent, or Firm*—Antonelli, Terry & Wands

[57] ABSTRACT

A nuclear reactor is supplied with feed water through a feed water pump system. A primary steam flow produced from the reactor is controlled by regulating a recirculated flow of feed water. The feed water pump system comprises two main pumps each of 55%-capacity and two auxiliary pumps each of 27.5%-capacity. Normally, the two main pumps are operated. Upon occurrence of abnormal condition of at least one main pump, the auxiliary pumps are started to supply feed water. At that time, the recirculated flow is controlled for a predetermined time to a reduced rate which is smaller as compared with that of the primary steam flow decreased rapidly due to the shutdown of the main pump. Subsequently, the recirculated flow is so controlled that the primary steam flow rate is slightly smaller as compared with the feed water flow which is determined by the available capacity of the pumps.

7 Claims, 8 Drawing Figures

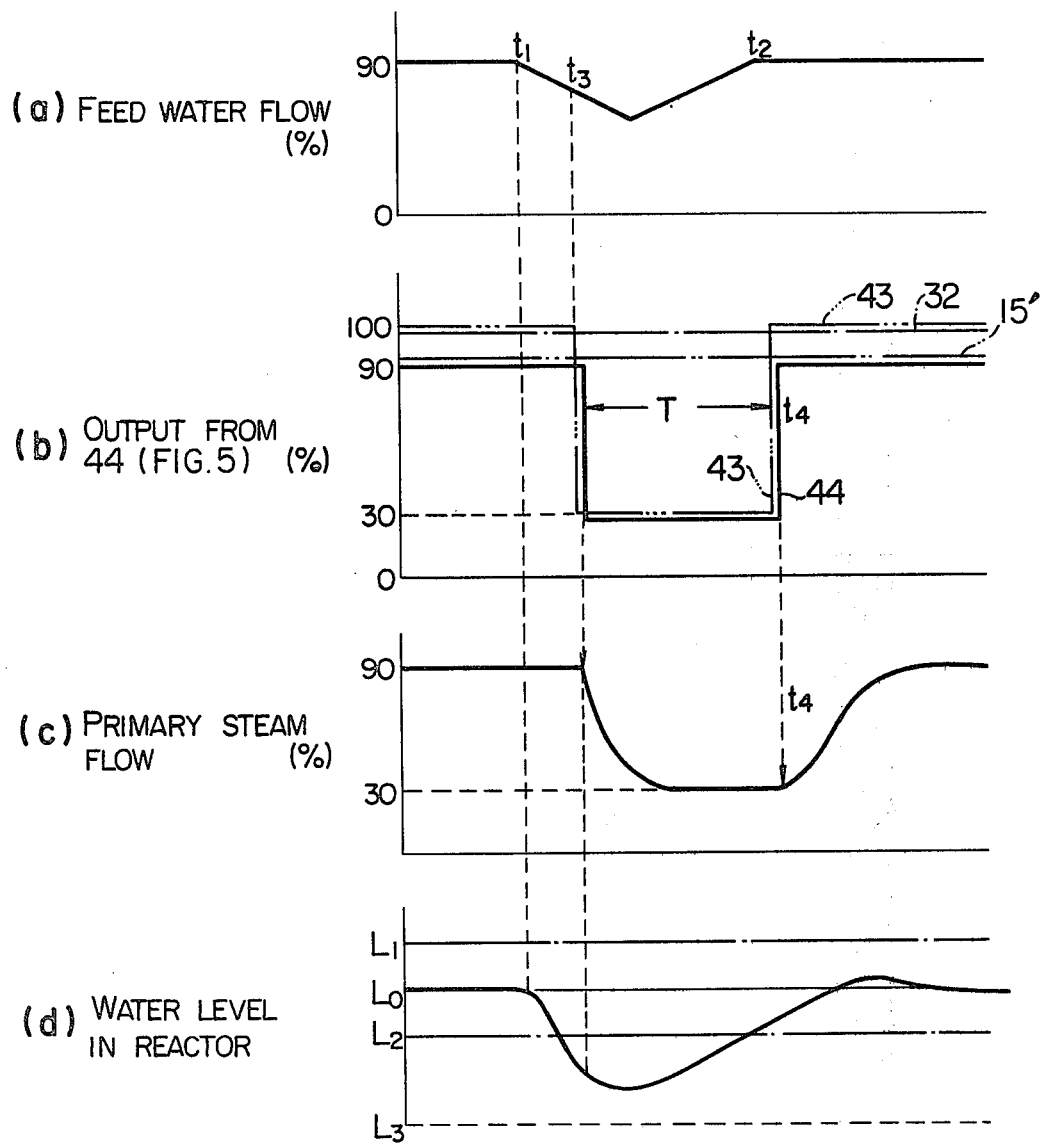

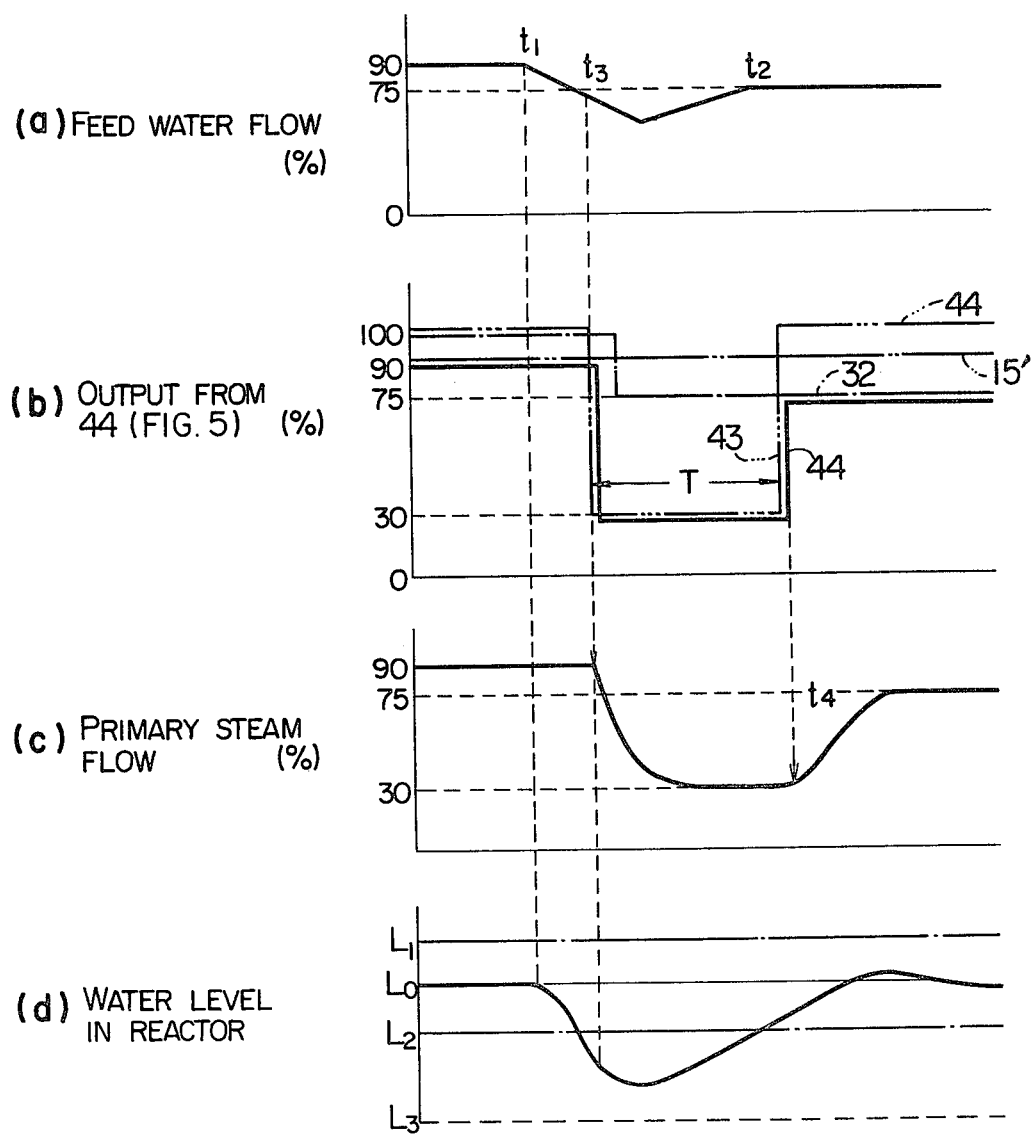

METHOD OF CONTROLLING NUCLEAR POWER PLANT

BACKGROUND OF THE INVENTION

The present invention relates to a method of controlling a nuclear power plant. More particularly, the invention concerns a controlling method which permits the output of a reactor to be controlled to a permissible maximum level while maintaining a water level within the reactor in a safe range, even when partial shutdown occurs in a feed water pump system.

In the first place, description will be made briefly of a nuclear power plant which the present invention concerns. As is well known, steam produced from a nuclear reactor is supplied to a main turbine by way of a main steam conduit and a regulating valve. Thereafter, the steam is condensed to water through a condenser. The condensate or water is then fed back to the reactor as feed water through a feed water pipe line under action of a feed water pump system.

In the nuclear power plant of this type, the feed water flow pumped by the pump system is controlled by using at least one of signals representing the water level within the reactor, the primary steam flow rate flowing through the main steam conduit and the feed water flow, respectively, so that the water level within the reactor remains constant.

The feed water pump system may be composed of four individual pumps, that is, two main pumps each of a 55%-capacity and two auxiliary pumps each of a 27.5%-capacity, where "55%" and "27.5%" indicate the ratios to the amount of the feed water flow required when the plant operates at its rating capacity. When the nuclear reactor is operated with the output in the vicinity of the rated power, the two main pumps are driven for supply feed water. The auxiliary pumps are used for backing up the main feed water pump or for starting the nuclear power plant.

With the arrangement of the feed water control system for the nuclear reactor described above, the feed water is supplied to the reactor by the two main feed water pumps of 55%-capacity in the normal operating condition. When the main feed water pump is tripped or shut down for some reasons, then the two auxiliary pumps each of 27.5%-capacity are started to assure the feed water flow to the reactor. By the way, since the main and auxiliary pumps differ from each other in respect of the capacity as mentioned above, there is necessarily brought about a difference between the primary steam flow rate and the feed water flow rate when both the main feed water pumps are tripped or shut down with the auxiliary pump failed to be started. Under such circumstance, the water level within the reactor may be lowered to an emergency level at which the reactor has to be shut down or scrammed.

However, the shutdown of the nuclear reactor (which means nothing but the shutdown of the nuclear power plant) due to abnormal condition of the feed water pumps must be avoided by all means. Once the scram occurs, an enormous time is required for restoring the plant to the normal operating condition. In this connection, it is theoretically known that the water level within the reactor is determined as a function of difference between the primary steam flow and the feed water flow. Accordingly, it will be possible to prevent the water level from being lowered to the emergency level by decreasing the primary steam flow rate, which means of course a corresponding decrease in the output power of the reactor (primary steam flow rate). Thus, it is not adequate to merely prevent the scram but desirable to be able to increase the power of the reactor as early as possible so that the nuclear power plant can be operated in a continuous manner even when the trip or partial shutdown occurs in the feed water pump system, because the reactor itself is in the normal condition.

SUMMARY OF THE INVENTION

An object of the invention is to provide a method of controlling a nuclear reactor so that the water level within the reactor can be held in a safe region while permitting the reactor to be operated at a permissible maximum power, even when one or two of the main feed water pumps are tripped or shutdown.

In view of the above and other objects which will become more apparent as description proceeds, it is proposed according to an aspect of the invention that, in a nuclear power plant provided with a plurality of feed water pumps and recirculated flow control means for controlling adjustably the reactor power, the condition of the feed water pumps is detected to thereby determine the recirculated water flow in dependence on the detected pump condition, whereby the recirculated water flow is automatically controlled in accordance with the available pump capacity.

BRIEF DESCRIPTION OF THE DRAWINGS

FIGS. 6(I) and 6(II) are views similar to FIG. 4 to illustrate operation of the apparatus shown in FIG. 5.

DESCRIPTION OF THE PREFERRED EMBODIMENTS

Figure 1:
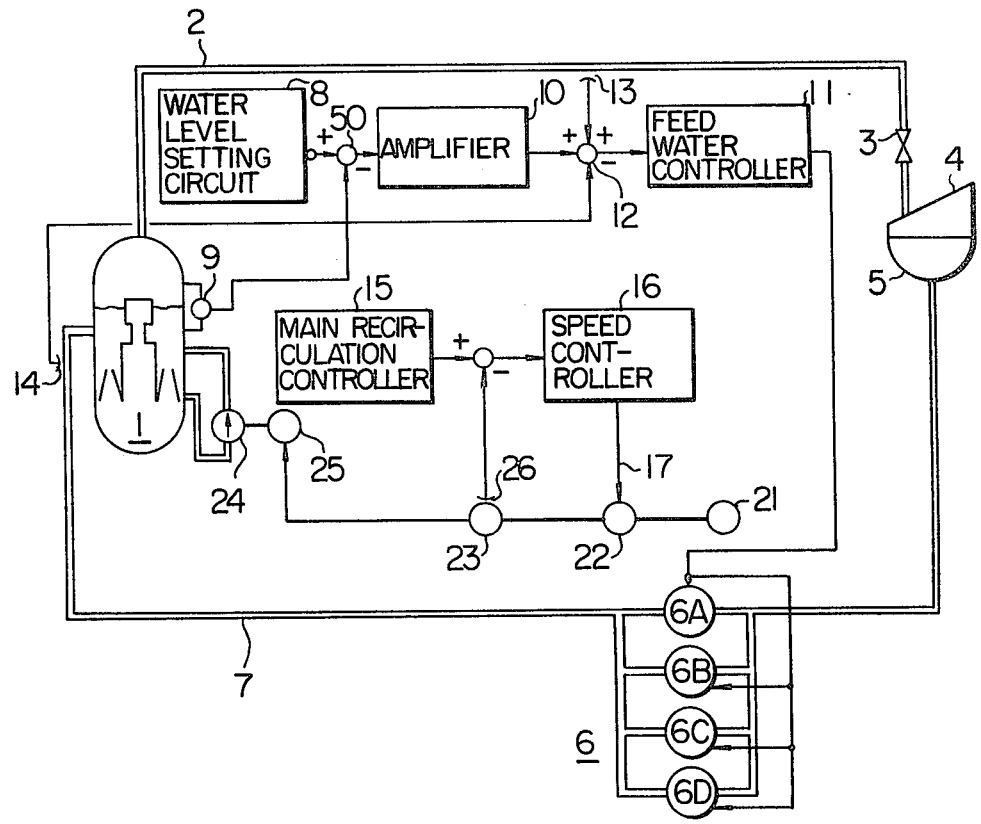
FIG. 1 shows schematically a general arrangement of a nuclear power plant with a control system to which the invention can be applied.

FIG. 1 shows schematically a general arrangement of a nuclear power plant with a feed water control system and a recirculation control system to which the invention can be applied. Steam produced within a nuclear reactor 1 is fed through a main steam conduit 2 and a regulating valve 3 to a main turbine 4 at which mechanical energy is generated and condensed to condensate water through a condenser 5. The condensate water is returned again to the nuclear reactor 1 through a feed water pipe 7 by means of a feed water pump system 6 which is composed of individual feed water pumps 6A, 6B, 6C and 6D.

The feed water control system is designed to maintain a water level within the nuclear reactor to be constant. The water level within the reactor is detected by a water level detector 9, the output signal of which is supplied to an adder 50 to be compared with an output signal produced from a water level setting circuit 8. The output signal from the adder 50 is amplified through an amplifier 10 and fed to one input of a second adder 12 which has two other inputs supplied with output signals from a primary steam flow detector 13 and a feed water flow detector 14, respectively. Thus, there can be obtained from the output of the second adder 12 a deviation or difference signal (hereinafter referred to also as a mismatch signal) as a function of the three control quantities (i.e. water level, the feed water flow and the steam flow). The mismatch signal thus produced from the adder 12 undergoes proportional plus integral operation at a feed water controller 11. The feed water flow rate of the pump system 6 is controlled in dependence on the output signal from the feed water controller 11. Usually, two feed water pumps (6A and 6B in the illustrated embodiment) have a capacity of the order of 55%, respectively, and are adapted to be driven from the turbine output. These two feed water pumps 6A and 6B are operated in the normal condition. The other two feed water pumps (6C and 6D in the case of the illustrated embodiment) are adapted to be driven by an electric motor and have a capacity of 27.5%, respectively. These motor-driven pumps 6C and 6D are destined to serve as the stand-by or auxiliary pumps.

On the other hand, the recirculation control system is provided for the purpose of controlling continuously the power output of the nuclear reactor by regulating the recirculated water flow through the reactor. Typically, the recirculation control system includes a motor/generator (M/G) set constituted by a drive motor 21, a fluid coupling 22 and an alternating current or A.C. generator 23, as is illustrated in FIG. 1. The rotating speed and hence the output frequency of the generator 23 is controlled by controlling the transmission efficiency of torque in the fluid coupling 23. The load of the generator 23 is constituted by an electric motor 25 for driving a recirculating pump 24. By controlling continuously the rotating speed of the motor 25, the recirculation water flow rate through the reactor core can be varied. The control system to this end is composed of a main recirculation controller 15, a speed detector 26 for the generator 23 and a speed controller 16. A speed demand signal issued from the main recirculation controller 15 is compared with the output signal from the generator speed detector 26, resulting in generation of a deviation or difference signal which is then subjected to proportional plus integral operation through the speed controller 16. The output signal from the controller 16 in turn is utilized as the control signal for controlling the transmission efficiency of torque in the fluid coupling 22. The recirculating pump 24, the M/G set and the speed controller 16 are usually implemented in two systems.

The nuclear power plant with the control systems which the present invention concerns is arranged in the manner briefly described above. Now, abnormal conditions of the feed water pumps which give rise to the lowering of the water level within the reactor and which is to be disposed of according to the invention will be described in the following.

An interlocking mechanism (not shown) is provided in such a manner that when one of the two turbine-driven feed water pumps (i.e. main pumps) 6A and 6B is shutdown or tripped, the motor-driven feed water pumps (i.e. auxiliary pumps) 6C and 6D are automatically and simultaneously started. In other words, upon shutdown of one of the turbine-driven feed water pumps, the feed water pumps driven by the electric motor are started automatically to assure a demanded flow rate of feed water. However, if a failure occurs in the back-up function of the motor-driven feed water pumps 6C and 6D due to some abnormal conditions of the interlocking system, a breaker for the driving motor, the pumps 6C or 6D itself and/or the piping system, the feed water flow will become insufficient, since the single turbine-driven feed water pump operating at that time has a capacity of 55% of that of the demanded feed water flow. As the consequence, the water level within the nuclear reactor continues to be lowered, leading eventually to the shutdown or scram of the whole plant. Futher, when both the turbine-driven feed water pumps are shut down, the flow of feed water will inevitably be decreased, to thereby involve the lowering of the water level within the reactor which is possible accompanied by the scram of the plant, even when the two motor-driven feed pumps are started.

Figure 2:
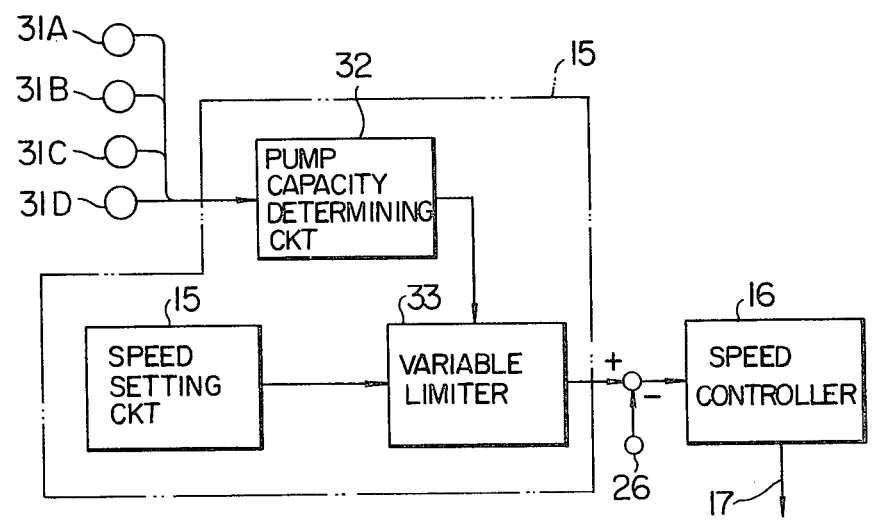
FIG. 2 shows an exemplary embodiment of a recirculation controller employed to carry out the method according to the invention.
Figure 3:
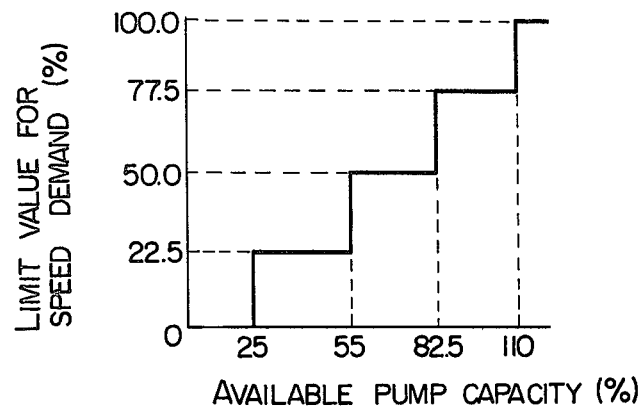
FIG. 3 illustrates graphically an input-output characteristic of a pump capacity determining circuit which constitutes a main part of the recirculation controller.
Figure 4:
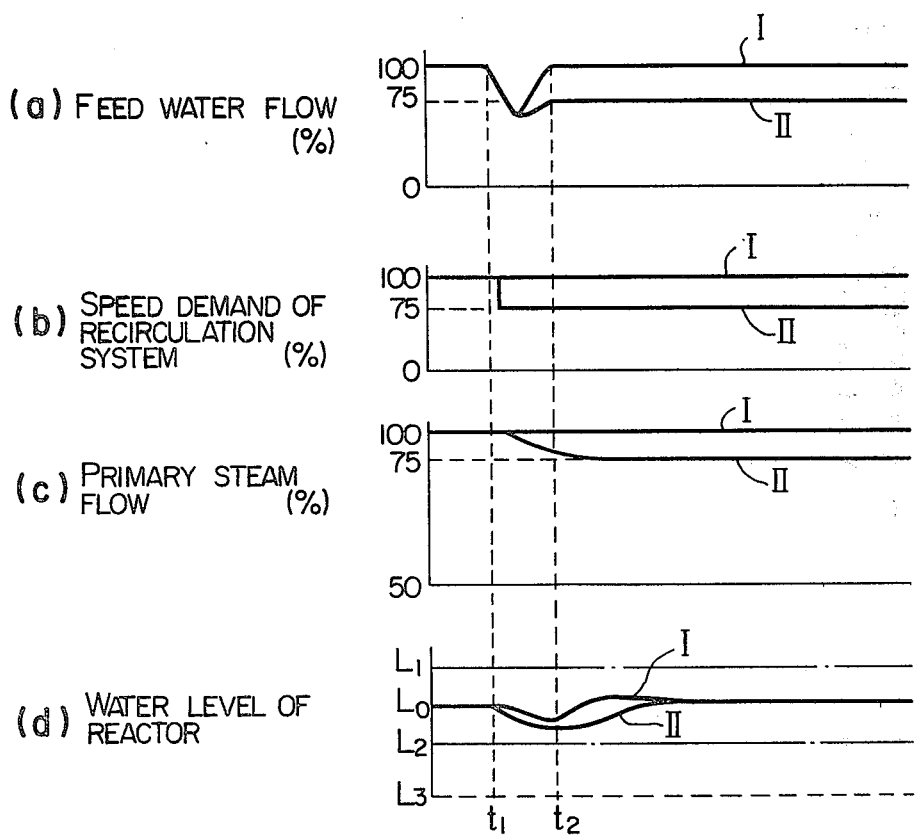
FIG. 4 graphically illustrates variations in feed water flow, steam flow and the water level within the reactor as a function of time in operation of the apparatus shown in FIG. 2.

FIG. 2 shows in a block diagram an arrangement of an apparatus for carrying out a control method according to the invention, while FIGS. 3 and 4 are to illustrate graphically operations of component units of the apparatus shown in FIG. 2. It should be noted that FIG. 2 shows mainly a construction of the main recirculation controller 15 of the recirculation flow control system shown in FIG. 1 according to an embodiment of the invention. In FIG. 2, same or like elements as those shown in FIG. 1 are denoted by the same reference numerals.

Now referring to FIG. 2, there is provided a detector 31 for detecting the operating conditions of the feed water pumps generally denoted by numeral 6 in FIG. 1. The detectors 31A, 31B, 31C and 31D are provided to the feed water pumps 6A, 6B, 6C, 6D, respectively, and each constituted by a relay circuit which is adapted to produce an output signal of logic "1" when the associated pump is normally operating and produce signal of logic "0" when the associated pump is inoperative due to failure or at the stand-by. Reference numeral 32 denotes a logical circuit which is supplied with the output signals from the detectors 31 and adapted to determine the availability of the pump capacity relative to the rated capacity. Reference numeral 33 designates a variable limiter circuit which receives the output signal from the available pump capacity determining circuit 32 to thereby limit the output from a speed or rate setting device 15'. The operation of the variable limiter circuit 33 is graphically illustrated in FIG. 3. More particularly, the magnitude of the speed demand signal is limited to the illustrated ranges in dependence on the available pump capacity.

Next, the operations of the control apparatus shown in FIG. 2 for preventing the water lever within the nuclear reactor from being lowered below an impermissible level and allowing the nuclear plant to be operated at a maximum permissible output power will be described by referring to FIG. 4 in which variation in the flow rate of feed water is illustrated at (a), the speed demand signal of the recirculation control system is illustrated at (b), variation in the primary steam flow is illustrated at (c), and variation in the water level within the reactor is illustrated at (d). Curves I and II shown in FIG. 4 correspond, respectively, to first and second cases described below. It is assumed that 100%-flow of the primary steam is assured by the two main pumps (i.e. the turbine-driven pumps) each of 55%-capacity, while the water level within the reactor is maintained at a level $L_0$ under the control of the recirculation control system. Further, it is assumed that one of the main feed water pumps is shut down or tripped at a time point $t_1$. Under the condition, the two auxiliary feed water pumps (i.e. the motor-driven pumps) can be started without failure, whereby the feed water flow is restored to 100% at a time point $t_2$. This corresponds to the first case described above and represented by the curve I shown in FIG. 4. In this case I, the pump capacity determining circuit 32 determines that the availability or activity rate of the pump capacity is 110%, whereby the limit value for the speed demand is left at 100%. Consequently, magnitude of the speed demand signal of the recirculation control system as well as the primary steam flow are maintained at the level of 100%. In this way, although the water level within the nuclear reactor becomes lowered to some degree due to a transient decreasing in the feed water flow during a period from $t_1$ to $t_2$ until operation of the auxiliary pumps is started, the water level will not be lowered to the scram or emergency level $L_3$. The transient lowering in the water level is detected by the water level detector 9 and the initial standard level $L_0$ is restored under action of the feed water flow control system. In the second case represented by the curves II in FIG. 4, it is assumed that, owing to malfunction of one of the two auxiliary feed water pumps, the only one main pump in combination with the only one auxiliary pump is permitted to be operated, whereby the availability of the overall pump capacity is reduced to 82.5%. Under the conditions, the pump capacity determining circuit 32 according to the invention will detect that one of the auxiliary pumps can not be started and makes decision that the availability of the pump capacity is of 82.5%, whereby the speed demand for the recirculation system is limited to 75%. Consequently, the primary steam flow is restricted to 75%. Although the water level within the reactor is lowered due to the mismatch between the feed water flow and the primary steam flow, it is possible to minimize the lowering of the water level and prevent it from reaching the scram level $L_3$ according to the invention. Of course, the initial water level $L_0$ can be finally restored, as is in the case I described above. Thus, in the aforementioned embodiments, the restoration of the initial or original water level is rendered possible due to the fact that magnitude of speed demand of the recirculation control system and hence the primary steam flow is restricted to a slightly smaller value (e.g. 75% in the second case) as compared with the availability of the pump capacity (e.g. 82.5% in the second case). This advantageous feature of the invention validly applies to other cases of the insufficient available pump capacities except for the case where the two main feed water pumps are shut down and at the same time the two auxiliary feed water pump can not be started, resulting in the available pump capacity of zero. For example, when the two auxiliary feed water pumps have failed to be started, the pump capacity determining circuit 32 decides that the availability of the pump capacity is reduced to 55%, whereby the primary steam flow is decreased, to 50%. In this manner, an important feature of the invention can be seen in the arrangement that the primary steam flow is determined in dependence on the overall available capacity of the feed water pumps.

Figure 5:
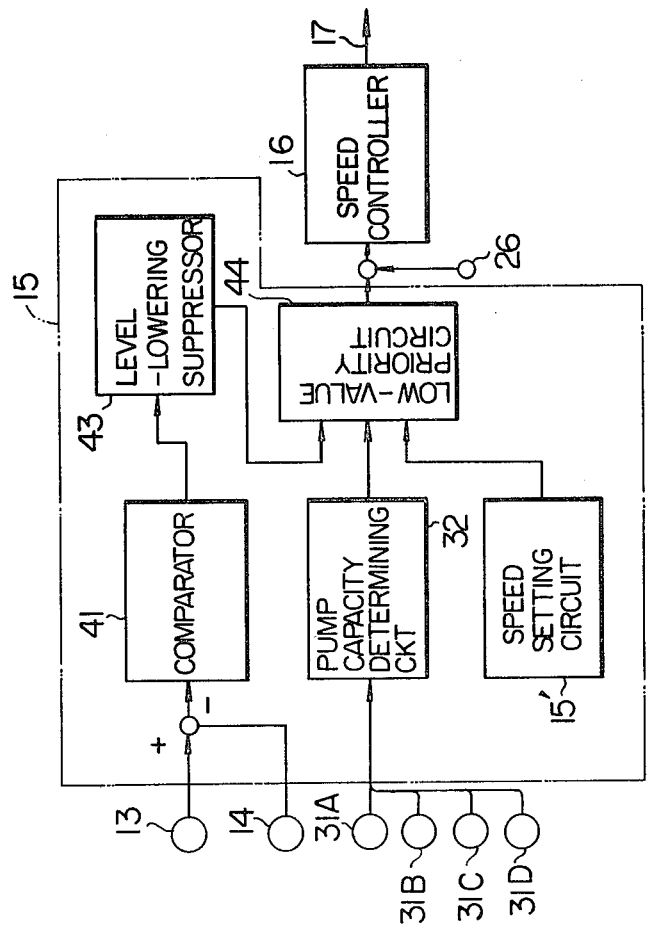
FIG. 5 shows another embodiment of the invention which is adapted to decrease rapidly the primary steam flow.

In the foregoing, an exemplary embodiment of the invention has been described. In this connection, it should be mentioned that there are some nuclear plants in which the effective cross-sectional area of the reactor is designed smaller relative to the power of the reactor, as the result of which the water level might be lowered to the scram level $L_3$ unless the primary steam flow is decreased more rapidly. FIG. 5 shows another embodiment of the invention which can be applied to the nuclear power plant of this kind. In this figure, same or like parts as those shown in FIGS. 1 and 2 are denoted by the same reference numerals. A comparator circuit 41 is provided to compare the output signal from the feed water flow detector 14 with the output signal from the primary steam flow detector 13. Increasing in the difference between these detector signals beyond a predetermined value will means insufficiency of the feed water flow. As the consequence, a level-lowering suppression or restriction circuit 43 is put into operation by the output signal from the comparator circuit 41, whereby magnitude of the output signal from the circuit 43 is decreased for a predetermined time. The circuit 32 for determining the available pump capacity produces a speed demand signal determined in dependence on the available pump capacity in the manner illustrated in FIG. 3. Numeral 44 denotes a low-value priority circuit which serves for selecting the signal of the smallest magnitude from the output signals produced by the pump capacity determining circuit 32, the level-lowering suppression circuit 43 and the recirculating pump speed setting circuit 15', respectively.

Next, operation of the arrangement described above for allowing the nuclear power plant to be operated at a permissible maximum power while inhibiting the water level from being excessively lowered will be described by referring to FIGS. 6(I) and 6(II) in which variation in the feed water flow is illustrated at (a), the output signal from the low-value priority circuit 44 is illustrated at (b), variation in the primary steam flow is illustrated at (c) and variation in the water level within the nuclear reactor is illustrated at (d). Curves shown in FIG. 6(I) and FIG. 6(II) correspond to first and second cases described below. In conjunction with FIGS. 6(I) and 6(II), it is assumed that the feed water flow of 100% is assured by the two main feed water pumps each having a 55%-capacity, while the primary steam flow of 100% is assured by the recirculation control system, whereby the water level within the nuclear reactor is maintained at the predetermined standard level $L_0$. Further, it is assumed that one of the main feed water pumps is shutdown or tripped at a time point $t_1$. Under the conditions, assumption that the auxiliary feed water pumps can be started without fail and the feed water flow of 100% can be restored corresponds to the first case mentioned above and graphically illustrated in FIG. 6(I). In this case, since the availability of the total pump capacity is of 110% around the time $t_1$ at which the one main feed water pump is shut down or tripped, the pump capacity determining circuit 32 will continue to produce the signal representing the recirculation flow of 100%, as is indicated by a single-dotted broken curve in FIG. 6(I) at (b). Although the output level of the speed setting circuit 15' can be selected at any given value, it is assumed that the output level of the circuit 15' is fixed at a signal level corresponding to the recirculation rate of 90%. Refer to a double-dotted broken curve at (b) of FIG. 6(I). The level-lowering suppression or restriction circuit 43 produces usually a signal corresponding to the recirculation flow rate of 100%, as indicated by a triple-dotted broken line in FIG. 6(I) at (b). Under the conditions, the output signal represented by a solid-line curve in FIG. 6(I) at (b) is selected by the low-value priority circuit 44 and utilized for controlling the recirculated flow rate after having been adjusted by the controller 16. Under the circumstances, when one of the main feed water pumps is shut down at the time point $t_1$ (FIG. 6), the feed water flow rate will immediately be decreased, being accompanied by the lowering of the water level within the reactor. Since the primary steam flow is constant at that time, difference between the output signals from the detectors 13 and 14 (FIG. 5) will be increased and detected by the comparator circuit 41 at a time point $t_3$, resulting eventually in that the level-lowering suppression or restriction circuit 43 is triggered. The output signal from the circuit 43 will be then immediately changed over to a low level (corresponding to 30% of the speed of the recirculating pump) from the high level. As the consequence, the low-value priority circuit will select the output signal from the circuit 43, whereby the recirculation flow and hence the primary steam flow is caused to decrease. Operation of the level-lowering suppression circuit 43 to decrease forcibly the primary steam flow is stopped at a time point $t_4$ after a time lapse of T. However, in the meantime, the feed water flow is increased with the primary steam flow being rapidly decreased due to the intitiated operation of the auxiliary feed water pumps, resulting in that the feed water flow becomes greater as compared with the primary steam flow, whereby the water level within the reactor is restored toward the initial level $L_0$. In order to make advantage of the action and effect of the inventive feature of suppressing the lowering of the water level within the nuclear reactor to a possible maximum degree, it will be necessary to decrease the primary steam flow at a high decreasing rate at a time point as early as possible. However, the suppression to an excessive degree will disadvantageously bring about a rise of the water level or fluctuation thereof. Accordingly, vavious constants or parameters of the level-lowering suppression circuit 43 have to be carefully determined in consideration of the characteristics of the feed water system, the recirculating system, the nuclear plant and the like. Further, it will be advantageous to render the various constants of the suppression circuit 43 variable in dependence on the operating condition around the time point at which the main feed water pump is tripped or shut down.

In the second case represented in FIG. 6(II), it is exemplarily assumed that only one of the auxiliary pumps can be started, whereby the feed water is supplied by the single main pump in cooperation with the single auxiliary pump. In this case, the feed water flow will finally be stabilized at 75%, as can be seen from the graph (a) in FIG. 6(II). The output signals from the level-lowering suppression circuit 43 and the speed or setting circuit 15', respectively, which make appearance at the output of the low-value priority circuit 44 are utterly same as is in the first case I illustrated in FIG. 6(I), as can be seen from the curve (b) in FIG. 6(II). Since the available pump capacity is of 82.5% due to the one-to-one combination of the main and auxiliary pumps, the output signal from the pump capacity determining circuit 32 is set at the level corresponding to the 75%-capacity in accordance with the characteristic illustrated in FIG. 3. Accordingly, at a time point when the level-lowering suppression circuit 43 is restored, the output signal from the pump capacity determining circuit 32 is selected by the low-value priority circuit 44, whereby the primary steam flow is suppressed to 75%. The operation of the control apparatus shown in FIG. 5 and described above in conjunction with FIG. 6(II) remains substantially same either when the two auxiliary feed water pumps are started upon trip or shutdown of one of the main feed water pumps or when the two auxiliary feed water pumps are started upon trip or shutdown of the two main feed water pumps.

As will be appreciated from the above description, the control apparatus shown in FIG. 5 also allows the water level within the reactor to be adjusted, since the maximum value of the primary steam flow is smaller than the feed water flow which is determined by the available pump capacity. Further, the lowering of the water level within the reactor can be suppressed advantageously by decreasing rapidly the primary steam flow. In both the control apparatus shown in FIGS. 2 and 5, the pump system which is operated at the 75%-capacity due to the inoperability of one of the auxiliary feed water pumps can of course be operated with the 100%-pumping capacity by repairing the failed auxiliary pump, since the output signal from the pump capacity determining circuit 32 is correspondingly changed.

Figure 7:
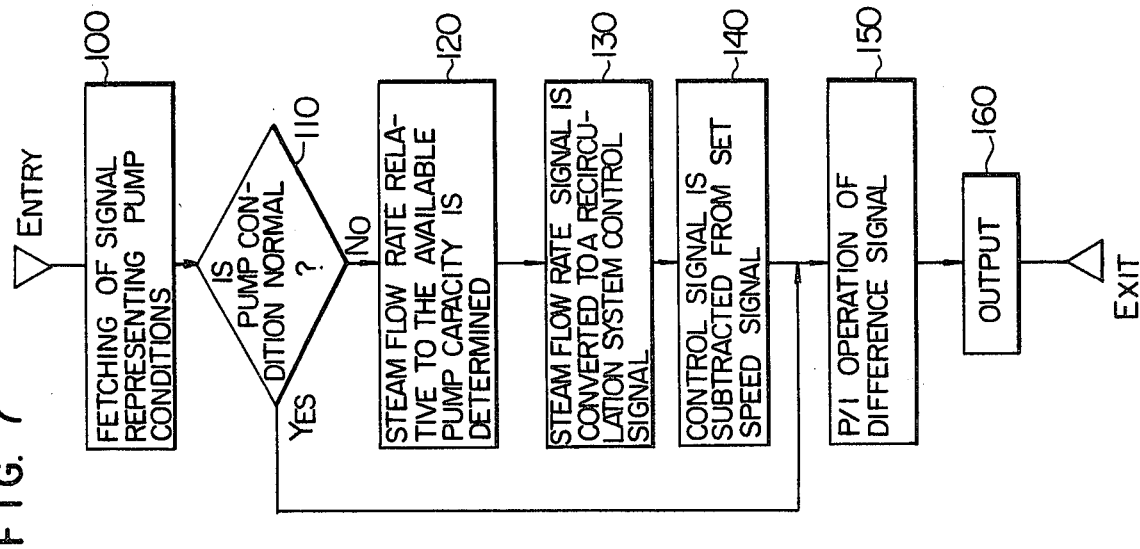
FIG. 7 is a flow chart to illustrate the concept of the invention to be executed by a digital computer.

In the foregoing description, it has been assumed that the analog control apparatus is employed. However, the invention can be carried out with the aid of a digital computer. In the following, an example of the digital control will be described by referring to a flow chart shown in FIG. 7. At a step 100, the operating conditions of the feed water pump system are fetched in the form of digital input signals.

Decision is made as to whether the feed water pump system is in the normal operating state at a step 110. When the feed water pump system is operating in the normal conditions, processing quantities are fetched to thereby effect the control operation in a usual manner. On the other hand, when decision is made to the effect that the abnormal condition prevails in the pump system, then the primary steam flow which corresponds to the available pump capacity is determined on the basis of the relation illustrated in FIG. 3 at a step 120 and reduced to a recirculation system control signal. The signal thus obtained is then subtracted from the actual speed demand signal, the difference being subsequently processed through a proportional plus integral operation to thereby produce a control signal.

An example of the procedures for performing the digital control has been described above. This procedure may be altered in the manner described hereinbefore in conjunction with FIG. 6. Of course, other various modifications will readily occur to those skilled in the art. It will be appreciated that the water level within the nuclear reactor can be held in a safe range with the power being maintained at a permissible maximum level according to the control method of the invention, even when the feed water pump system suffers external disturbances. The invention can be applied to power reactors of a large size with great advantages.

We claim:

1. A method of controlling an output of a nuclear power plant including a boiling water reactor having first and second coolant loops, a plurality of feed water pumps in the first loop selectively driven for feeding water into the reactor, and a recirculating control system in the second loop for controlling a flow rate of steam generated in the first loop by the reactor by controlling a recirculating water flow rate in the second loop of the reactor, the method comprising the step of controlling the recirculating water flow rate in response to the tripping of at least one of the plurality of feed water pumps, the control of the recirculating water flow rate being effected in accordance with an available water feeding capacity provided by the remaining feed water pumps wich are not tripped, and thereby controlling the flow rate of steam produced by the reactor.

2. A method according to claim 1, further comprising the step of determining the tripping of at least one of the plurality of feed water pumps, and controlling the recirculating water flow rate in response to the tripping determination.

3. A method according to claim 2, further comprising the step of determining the available water feeding capacity provided by the remaining feed water pumps which are not tripped, and controlling the recirculating water flow rate in accordance therewith.

4. A method of controlling an output of a nuclear power plant including a boiling water reactor having first and second coolant loops, a water feed pipe system in the first loop connected to the reactor and having a plurality of water feed pumps for feeding water into the reactor, a steam pipe system connected to the reactor for feeding steam produced by the reactor from the reactor, and a recirculating control system in the second loop for controlling a recirculating water flow rate in the second loop of the reactor to thereby control the flow rate of steam produced in the first loop by the reactor, the method comprising the step of controlling the recirculating water flow rate in response to the tripping of at least one of the plurality of water feed pumps, the recirculating water flow rate being controlled for a predetermined period of time so as to cause the flow rate of steam produced by the reactor to be less than the flow rate of the feed water supplied to the reactor.

5. A method according to claim 4, further comprising the step of controlling the recirculating flow rate in accordance with an available water feeding capacity provided by the remaining water feed pumps which are not tripped in response to the lapse of the predetermined period of time, and thereby controlling the flow rate of steam produced by the reactor.

6. A method according to claim 5, further comprising the step of determining the tripping of at least one of the plurality of feed water pumps, and controlling the recirculating water flow rate in response to the tripping determination.

7. A method according to claim 6, further comprising the step of determining the available water feeding capacity provided by the remaining water feed pumps which are not tripped, and controlling the recirculating flow rate in accordance therewith.

* * * * *